Sept. 20, 1927.
J. S. DAVIS
1,643,200
CULTIVATOR ATTACHMENT
Filed Oct. 1, 1926
2 Sheets-Sheet 1
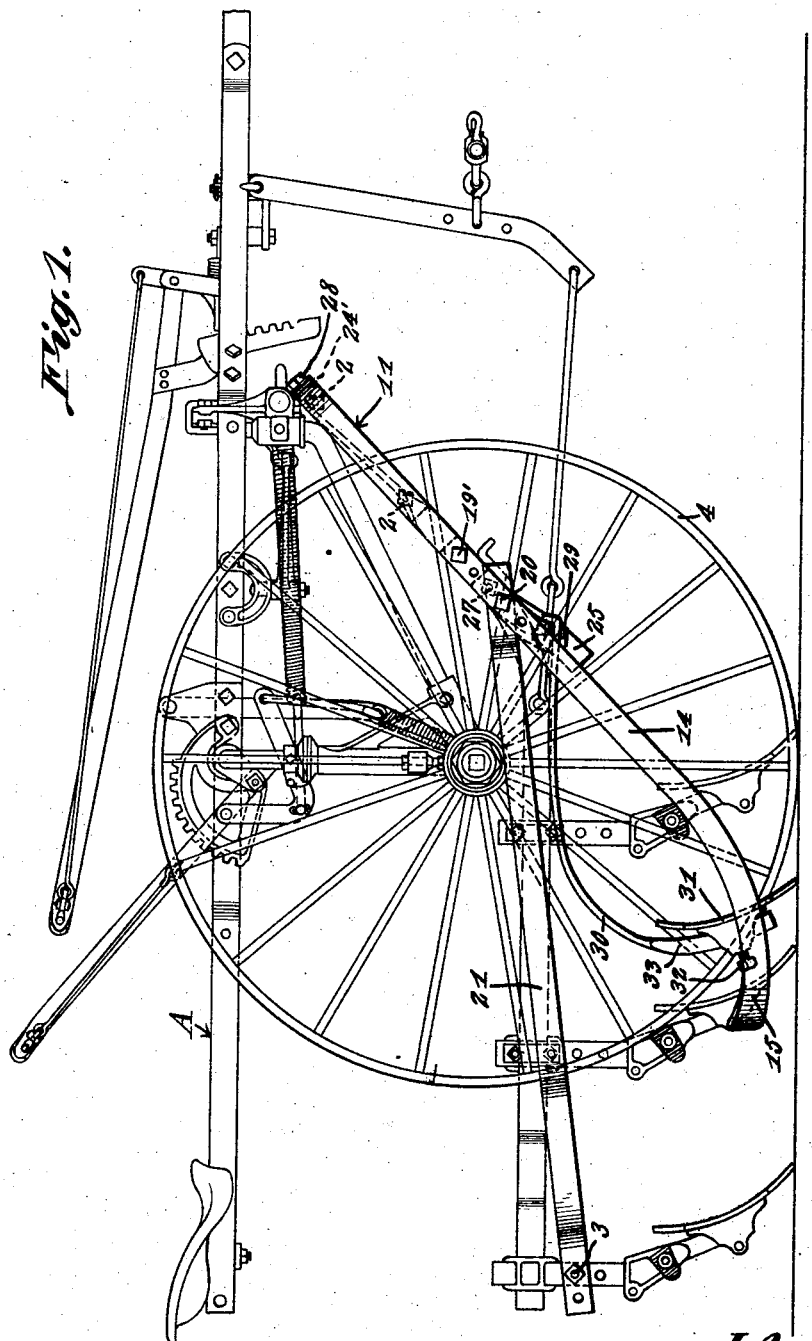
INVENTOR.
BY John S. Davis,
ATTORNEY.

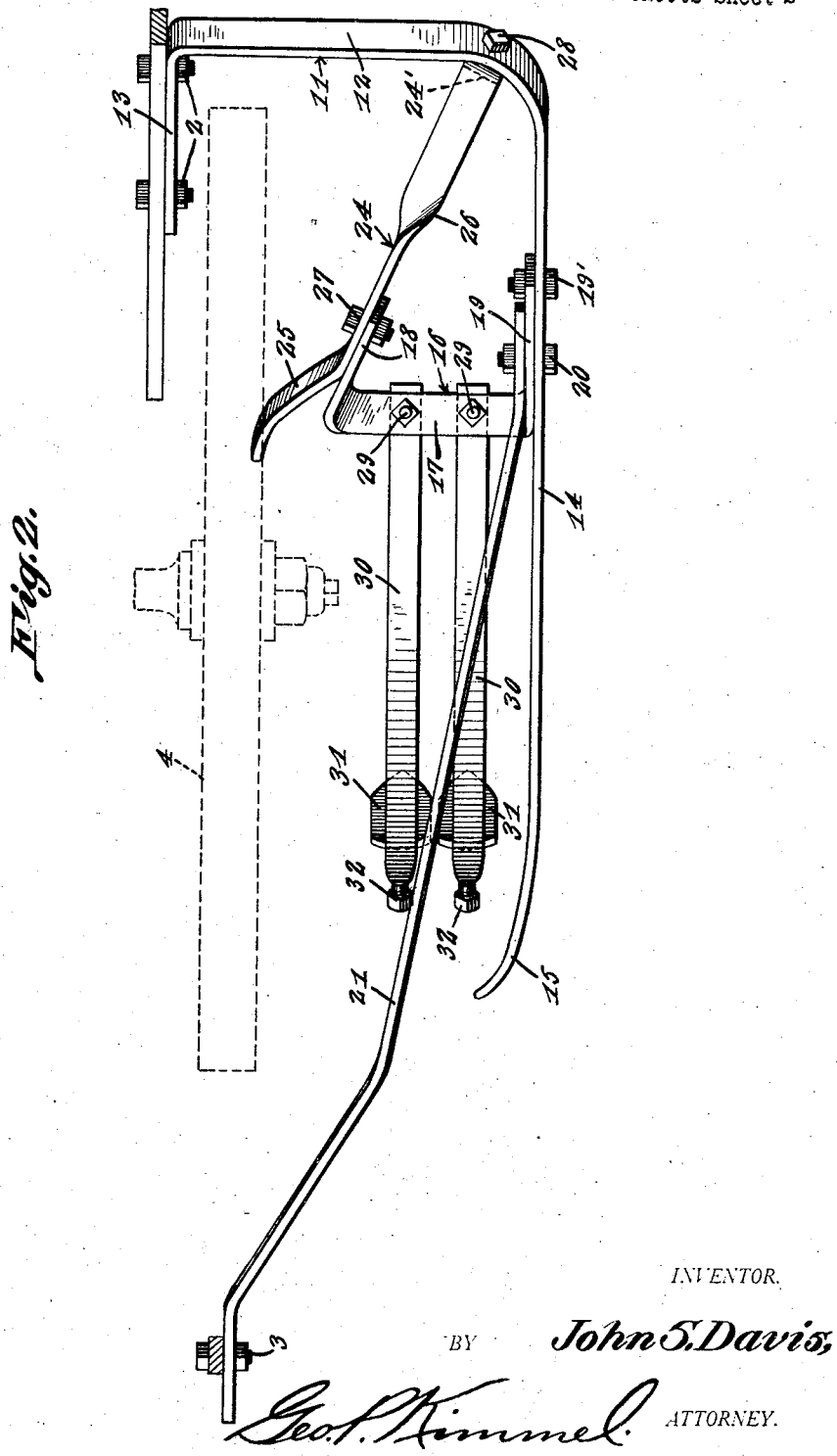

Patented Sept. 20, 1927.

1,643,200

UNITED STATES PATENT OFFICE.

JOHN S. DAVIS, OF NEAR FELTON, DELAWARE.

CULTIVATOR ATTACHMENT.

Application filed October 1, 1926. Serial No. 138,975.

This invention relates to a cultivator attachment, and has for its object to provide, in a manner as hereinafter set forth, an attachment for use in connection with a cultivator of the riding type for cultivating close to growing fruit trees or plants and vines of a grape vineyard and further enabling an operator to work in close to and in and out around a tree or plant, accomplishing in one operation, what ordinarily calls for three, viz:—riding cultivator, single cultivator and furrowing.

A further object of the invention is to provide in a manner as hereinafter set forth, a cultivator attachment for riding cultivators operating between one wheel of the latter and the growing tree, plant or vine and adapted when used to dispense entirely with a single cultivator and reducing the hoeing ordinarily required during cultivation to a minimum.

Further objects of the invention are to provide, in a manner as hereinafter set forth, a cultivator attachment, termed an extension gang, which is simple in its construction and arrangement, strong, durable, compact, thoroughly efficient in its use, conveniently installed with respect to a riding cultivator and comparatively inexpensive to manufacture.

With the foregoing and other objects in view, the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a riding cultivator, of the pivoted axle type showing the adaptation therewith of an attachment, termed an extension gang, in accordance with this invention.

Figure 2 is a top plan view of a cultivator attachment in accordance with this invention.

Referring to the drawings in detail A generally indicates a riding cultivator of the type including an axle provided with a pair of shiftable spindles upon which are revolubly mounted the side wheels. The cultivator A further includes a gang or gangs and a drag bar therefor. The cultivator is illustrated for the purpose of showing the adaptation therewith of an attachment extension gang, in accordance with this invention, and no claim is made to any of the elements of the cultivator A.

An attachment for cultivators, in accordance with this invention, and which is termed an extension gang, when coupled with the cultivator operates between one of the wheels of the latter and the tree or plant and as shown the extension is coupled with the forward portion of the cultivator frame, as at 2, and with a cultivator gang as at 3.

The attachment includes an upwardly and forwardly inclined combined carrier and coupling element referred to generally by the reference character 11 and which is constructed from a metallic bar of appropriate length, width and thickness. The bar from which the element 11 is constructed is shaped to form a forward arm 12, an inner rearwardly directed arm 13 and an outer rearwardly directed arm 14 of materially greater length from the arm 13 and which has its rear end curved upwardly and inwardly as at 15 to form what may be termed a guide, protector or deflector. The forward arm 12 of the element 11 is of greater length than the length of the arm 13, but of less length than the arm 14. The rearwardly directed arms 13 and 14 merge at their forward ends into the ends of the forward arm 12. When the attachment is coupled with the cultivator A, the forward arm 12 of the element 11 is positioned a substantial distance above the hub of and forwardly with respect to the wheel 4 of the cultivator A which said element straddles the forward part of. The arm 14 when the element is coupled with the cultivator, has its lower end spaced a substantial distance above the ground level.

Positioned against the inner side face of the arm 14 of the element 11, intermediate the ends of said arm 14, is a yoke-shaped member, referred to generally by the reference character 16 and which is disposed longitudinally with respect to the portion 14. The member 16 includes a base 17 which is arranged at right angles with respect to the arm 14 of the element 11 and said member further includes a pair of side arms 18, 19 and with the latter of greater length than the former. The arm 19 is fixedly secured to the inner face of the arm 14 and the arm 18 extends forwardly and at an outward inclination so as to project towards the arm 19. The arms 18 and 19 project forwardly and upwardly from the base 17 and the latter is disposed at a downward and rearward inclination. The arm 19 is secured against the inner side face of the arm 14 by a hold fast device 19'. The arm 19 is also secured to the arm 14 by a hold fast device 20, but this latter further coupled with the arm 19 and arm 14 of the element 11, the forward end of a rearwardly extending and downwardly inclined angle-shaped brace member 21 which has its rear end fixed by the hold fast device 3, to a standard of a gang of the cultivator. The arm 13 of the element 11 is fixedly secured to the cultivator frame by the hold fast devices 2.

Secured to the arm 12 of the element 11, and also to the arm 18 is a combined guard and brace element, referred to generally by the reference character 24 and which is constructed from a metallic bar formed of a curved rear portion 25 which constitutes a wheel guard and a torsionally twisted forward portion 26 which constitutes a brace between the member 15 and the element 11. The rear portion 25 of the element 24 extends inwardly from the member 16. The forward portion 26 of the element 24 is secured by the hold fast device 27 to the arm 18 of the member 16 and is formed with a flange 24' which is secured by the hold fast device 28 to the portion 12 of the arm 11. The combined guard and brace element is disposed at an upward inclination, it extends rearwardly from the arm 12 of the element 11 and at an inward inclination with respect to the arm 14 of the element 11.

Secured to the inclined base 17 of the member 16, by the hold fast devices 29 is a plurality of curved resilient standards 30 each provided with a cultivating element 31 adjustably connected therewith as at 32. The standards 30, with respect to the member 16 extend upwardly and rearwardly therefrom and downwardly and the lower portion of each is of polygonal contour, as at 33, and upon which is adjustably connected the cultivating member or element 31.

When the attachment is coupled with the cultivator A, the guard 25 is arranged in close proximity to the wheel of the cultivator which is straddled by the element 11. The brace member 21 extends between a pair of standards 30. The arm 14 has the lower portion thereof arranged outwardly with respect to the outer cultivator or member 31 of the attachment, and the curved lower terminal portion of the arm 14 opposes and extends rearwardly from said outer cultivating element 31. The length of the arm 12 of the element 11 is such as to maintain the cultivating elements 31 a substantial distance from the wheel of the cultivator A, when the attachment is coupled with the latter. The attachment is adjustably connected to the cultivator.

It is thought the many advantages of a cultivator attachment, termed an extension gang, in accordance with this invention can be readily understood, and although the preferred embodiment of the invention is as illustrated and described, yet it is to be understood that changes in the details of construction can be had which will fall within the scope of the invention as claimed.

What I claim is:—

1. A cultivator attachment comprising a substantially yoke-shaped combined carrier and coupling element adapted to be secured with the cultivator in overlapping position with respect to a wheel of the latter and further to project forwardly and at an upward inclination with respect to the wheel, a rearwardly extending brace member having its forward end connected to said element, intermediate the ends of the latter, and adapted to have its rear end secured to a gang of the cultivator, a supporting member arranged within and connected to said element intermediate the ends of the latter, a combined guard and brace member secured to said element and supporting member and extending rearwardly from the latter at a downward inclination, ground working means positioned exteriorly of the cultivator wheel and secured to and extended rearwardly from said supporting member, and said carrier having the rear end thereof at its outer side upwardly and inwardly curved forming a guide opposing the outer side of said means.

2. A cultivator attachment comprising a substantially yoke-shaped combined carrier and coupling element adapted to be secured with the cultivator in overlapping position with respect to a wheel of the latter and further to project forwardly and at an upward inclination with respect to the wheel, a rearwardly extending brace member having its forward end connected to said element, intermediate the ends of the latter, and adapted to have its rear end secured to a gang of the cultivator, a supporting member arranged within and connected to said element intermediate the ends of the latter, a combined guard and brace member secured to said element and supporting member and extending rearwardly from the latter at a downward inclination, ground working means positioned exteriorly of the cultivator wheel and secured to and extended rearwardly from said supporting member, said combined guard and brace member disposed at an inclination with respect to the outer side of said combined carrier and coupling element, and said brace member extending downwardly at an inclination and over said supporting member and means.

3. A cultivator attachment comprising a combined carrier and coupling member adapted to be connected to the cultivator and of yoke-shape in plan, the inner side of said element being of less length than the outer side thereof and adapted to be detachably secured with the cultivator, said element when connected to the cultivator extending forwardly at an upwardly inclination and overlapping and projecting forwardly from one of the cultivator wheels, a yoke-shaped supporting member positioned within said element and having its outer arm secured to the outer side of said element, ground working means, positioned exteriorly of the cultivator wheel and secured to and extended rearwardly from said supporting member, a combined guard and brace member having its forward end secured to the forward end of said element and further connected intermediate its ends to the inner arm of said supporting member, said combined guard and brace member disposed at an inclination throughout with respect to said element and having its rear portion extended rearwardly at a downward inclination from said supporting member and providing a guard, and an inwardly inclined rearwardly extending brace member connected at its forward end with said supporting member and the outer side of said element and adapted to have its rear end detachably connected with a gang of the cultivator rearwardly with respect to said supporting member, said rearwardly disposed brace member extending over and rearwardly from said supporting member and ground working means.

4. A cultivator attachment comprising a combined carrier and coupling member adapted to be connected to the cultivator and of yoke-shape in plan, the inner side of said element being of less length than the outer side thereof and adapted to be detachably secured with the cultivator, said element when connected to the cultivator extending forwardly at an upward inclination and overlapping and projecting forwardly from one of the cultivator wheels, a yoke-shaped supporting member positioned within said element and having its outer arm secured to the outer side of said element, ground working means positioned exteriorly of the cultivator wheel and secured to and extended rearwardly from said supporting member, a combined guard and brace member having its forward end secured to the forward end of said element and further connected intermediate its ends to the inner arm of said supporting member, said combined guard and brace member disposed at an inclination throughout with respect to said element and having its rear portion extended rearwardly at a downward inclination from said supporting member and providing a guard, an inwardly inclined rearwardly extending brace member connected at its forward end with said supporting member and the outer side of said element and adapted to have its rear end detachably connected with a gang of the cultivator rearwardly with respect to said supporting member, said rearwardly disposed brace member extending over said supporting member and ground working means, the rear portion of said combined guard and brace member constituting a guard being inwardly curved in the direction of its length.

In testimony whereof, I affix my signature hereto.

JOHN S. DAVIS.